(No Model.)

W. T. SIMS.
REIN SUPPORT.

No. 405,278. Patented June 18, 1889.

Witnesses.
A. Ruppert.
R. P. Wilson

Inventor.
William T. Sims
by Franklin H. Hough
his Attorney

UNITED STATES PATENT OFFICE.

WILLIAM T. SIMS, OF YAZOO CITY, MISSISSIPPI.

REIN-SUPPORT.

SPECIFICATION forming part of Letters Patent No. 405,278, dated June 18, 1889.

Application filed March 22, 1889. Serial No. 304,264. (No model.)

*To all whom it may concern:*

Be it known that I, WILLIAM T. SIMS, a citizen of the United States, residing at Yazoo City, in the county of Yazoo and State of Mississippi, have invented certain new and useful Improvements in Rein-Supports for Harnesses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in devices for supporting the lines or reins upon the rump of the animal when the said reins are slack instead of allowing them to drop down alongside the animal and become entangled in the harness.

A further object of the invention is to provide a simple and inexpensive attachment for harnesses, which may be readily secured to the back-strap of the harness, said attachment being provided with rings for the passage of the reins and being equally well adapted for use in connection with any of the various forms or styles of harness in common use.

To the above ends and to such others as the invention may pertain the same consists in the peculiar combinations and in the novel construction, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1:
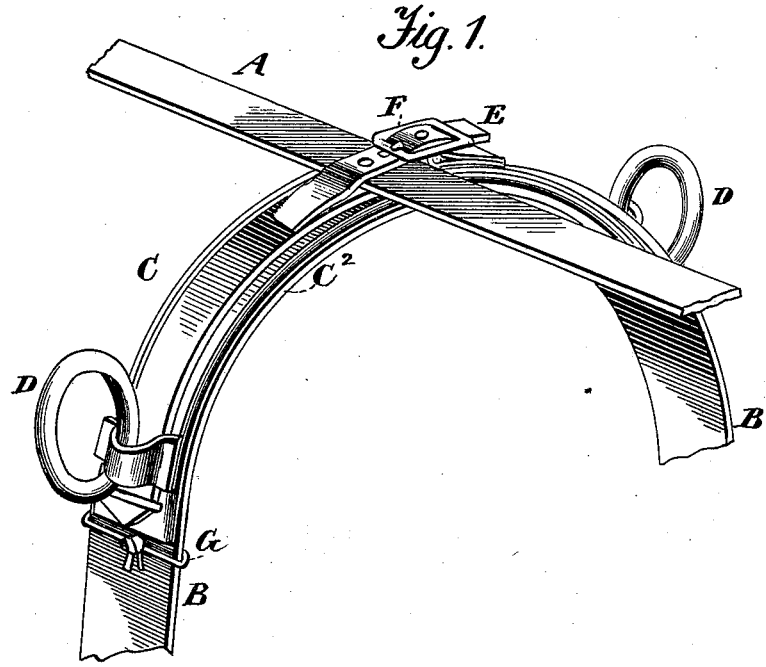
Figure 2:
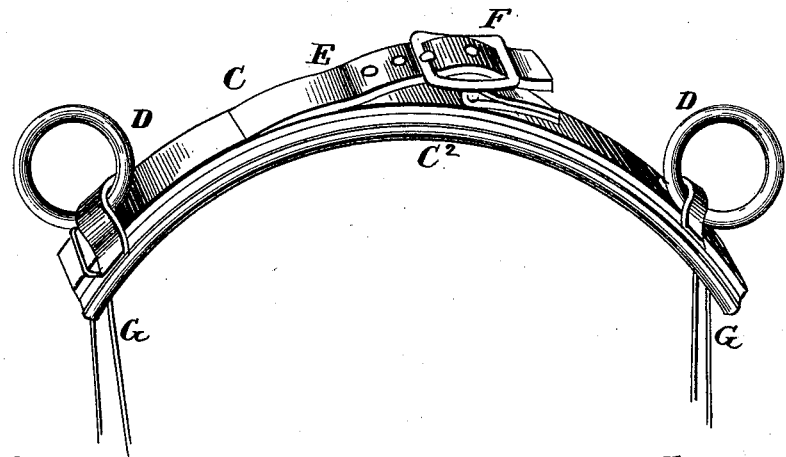

Figure 1 is a perspective view of a portion of a harness with my attachment shown as in actual use. Fig. 2 is a similar view of the device removed from the harness.

Reference now being had to the details of the drawings by letter, A designates the back-strap, and B the hip-strap, of a harness.

C represents my attachment, which consists of the main strap $C^2$, provided at points near its ends with rings D, and upon its upper face, at a point substantially at the longitudinal center of the strap, with the supplemental strap E and buckle F, for a purpose which will presently appear.

G G are cords or straps secured to the strap C at points adjacent to its ends, said cords being used in securing the ends of the strap to the hip-straps of the harness when the attachment is in use.

In adapting my attachment for use upon the harness, the strap E is passed through a loop upon the back-strap of the harness at the point at which said strap is intersected or crossed by the hip-straps, and the ends of the strap C are tied or otherwise secured to the hip-straps upon each side. The attachment having thus been secured in place, the reins are passed through the rings D, and are thus prevented from falling down when slack, and are held at all times in such a position as to prevent the horse from binding or holding the reins beneath the tail.

It will be readily seen that the attachment is simple and efficient in operation, and that it can be readily attached to any harness.

Having thus described my invention, what I claim to be new, and desire to secure by Letters Patent, is—

1. In a device for the purpose described, the combination, with a strap having rings secured near its free ends and provided at its longitudinal center with means for securing the strap to the back-strap of a harness, of the cords or straps attached to the ends of the straps C for securing the said ends to the hip-straps of the harness, substantially as and for the purpose specified.

2. The combination, with the back and hip straps of a harness, of the strap C, secured at its longitudinal center to the back-strap, the rings D upon said strap, and the cords attached to the free ends of the strap and adapted for use in securing the said ends to the hip-straps of the harness, substantially as described.

In testimony whereof I affix my signature in presence of two witnesses.

WILLIAM T. SIMS.

Witnesses:
 R. A. PICKETT,
 A. M. HICKS.